United States Patent [19]

Kimbrough et al.

[11] Patent Number: 4,828,061
[45] Date of Patent: May 9, 1989

[54] CLOSED-LOOP FOUR WHEEL STEERING SYSTEM HAVING DUAL RESPONSE RATE REAR STEERING

[75] Inventors: Scott S. Kimbrough, Warren; Rao M. Chalasani, Troy; Steven J. Hallman, Saginaw, all of Mich.

[73] Assignee: General Motors Corporation, Detroit, Mich.

[21] Appl. No.: 211,731

[22] Filed: Jun. 27, 1988

[51] Int. Cl.$^4$ ............................................. B62D 5/04
[52] U.S. Cl. .................................. 180/79.1; 180/140; 180/142; 364/424.05
[58] Field of Search ...................... 180/79.1, 140, 141, 180/142; 364/424

[56] References Cited

U.S. PATENT DOCUMENTS 4,418,780 12/1983 Ito .................................... 180/140 X
4,779,693 10/1988 Takahashi et al. .................. 180/140

OTHER PUBLICATIONS

"A Variable Response Vehicle—Description and Applications" presented at the Joint Automatic Control Conference, Univ. of Texas, Jun. 19–21, 1974.
Four-Wheel Steering, Made in Japan, *Automotive Industries*, Aug. 1987.
Nissan Demonstrates its New 4Ws, *Automotive News*, Jun. 8, 1987.

*Primary Examiner*—John A. Pekar
*Attorney, Agent, or Firm*—Mark A. Navarre

[57] ABSTRACT

The driver steering inputs of a closed-loop reference model rear vehicle steering system are measured and subjected to a filter function that delays application of the measured input to the reference model. Externally generated steering inputs appearing in the parameters measured for closed-loop control are subjected to a different filter function which imparts only minimal delay of the signal transmission. As a result, the rear steer control responds at a first, relatively slow rate to driver steering inputs, and a second, relatively fast rate to externally generated disturbances.

8 Claims, 5 Drawing Sheets

CLOSED-LOOP FOUR WHEEL STEERING SYSTEM HAVING DUAL RESPONSE RATE REAR STEERING

This invention relates to motor vehicle four wheel steering systems, and more particularly to a closed-loop rear steering control having different control response rates for driver and externally applied inputs.

BACKGROUND OF THE INVENTION

In most four-wheel steer vehicles, the front wheels are steered together in direct and usually linear relation to the steering input of the driver, as in a two-wheel steer vehicle. The rear wheels are steered together as a function of the front wheel steering angle and/or the vehicle speed, to provide desired ride or handling characteristics. The desired ride or handling characteristics are electrically or mechanically simulated to define a reference model, and the rear steering angle required to achieve the desired characteristics is carried out by the rear wheel steering mechanism.

An early mechanization of a four-wheel steer control, as generally set forth above, was described in detail in a paper presented by K. J. McKenna at the Joint Automatic Control Conference held at University of Texas in June, 1974, entitled "A Variable Response Vehicle—Description and Applications". The control described in the paper incorporated a reference steer mode in which a reference model supplied the desired yaw rate and lateral velocity, and a closed-loop control developed the steering commands in relation to a comparison between the desired and actual (measured) parameters. Being closed-loop, this type of control responds not only to driver steering inputs, but also to external disturbances which affect the measured parameters.

A control dilemma encountered in a closed-loop four-wheel steer system of the type generally referred to above, concerns rationalizing the control response to driver inputs and externally generated inputs. To be able to stabilize the vehicle in response to externally generated inputs—wind gusts, for example—the yaw response of the rear steering control must be relatively fast. On the other hand, such relatively fast rear steering yaw response tends to produce a sudden reaction to driver steering inputs, which may be undesirable at relatively high vehicle speeds. Moreover, control responses to noise in the signal representing the driver steering input also tends to degrade drivability.

SUMMARY OF THE PRESENT INVENTION

The present invention is directed to an improved closed-loop reference model rear steering control system having different control response rates for driver and externally generated steering inputs. In mechanizing this control, the driver steering input is measured and subjected to a filter function that delays application of the measured input to the reference model. The externally generated steering inputs appear in the parameters measured for closed-loop control. Such measurements are subjected to a different filter function which imparts only minimal delay of the signal transmission. As a result, the rear steer control responds at a first, relatively slow rate to driver steering inputs, and a second, relatively fast rate to externally generated disturbances.

In the preferred embodiment, the delay of the filter function is sensitive to both vehicle speed and the amplitude of the measured driver steering input. The vehicle speed sensitivity permits faster response at low vehicle speeds where vehicle stability is not degraded. The driver steering input amplitude sensitivity permits rejection of low amplitude noise in the measured signal while passing signals of an amplitude and frequency typically generated by driver steering inputs.

DETAILED DESCRIPTION OF THE DRAWINGS

Figure 1:
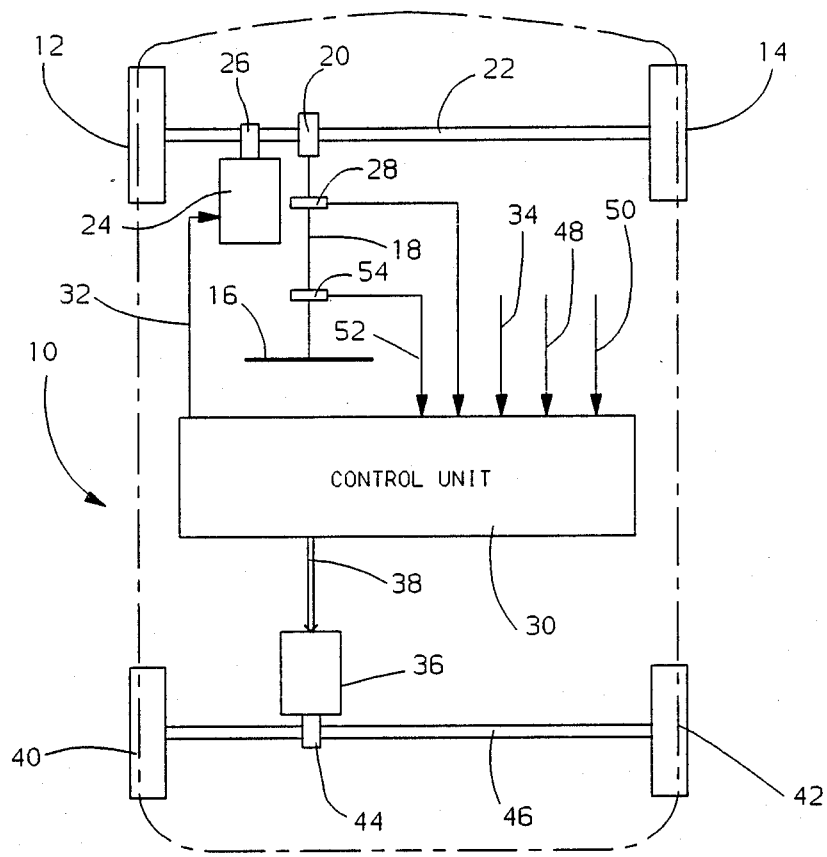
FIG. 1 is schematic diagram of a four-wheel steer vehicle including a computer-based control unit for carrying out the control of this invention.

Referring now particularly to FIG. 1, the reference numeral 10 generally designates a motor vehicle having four steerable wheels. The front wheels 12, 14 are steered together in response to rotation of an operator manipulated handwheel 16. The handwheel 16 is mechanically connected via steering column 18 to a pinion gear 20, which is maintained in meshing engagement with teeth formed on a front rack 22. The front rack 22, in turn, is connected to front wheel tie rods (not shown), completing the mechanical linkage connecting the front wheels 12, 14 to the handwheel 16.

An electric motor 24 drives a second pinion gear 26, also maintained in meshing engagement with the front rack teeth. The motor 24 is adapted to be energized in relation to the operator exerted steering torque for generating a power steering assist torque which aids the driver exerted torque. To this end, a torque sensor 28 is disposed in relation to the steering column 18 for generating an electrical signal in accordance with the operator exerted steering torque. Such signal is applied as an input to a computer-based control unit 30, which among other things, controls the energization of electric motor 24 via line 32 for generating the proper magnitude and direction of steering assist. A signal indicative of the vehicle speed $V_x$ is applied as an input to the control unit 30 via line 34, which signal may also be used as a parameter for steering control. Control apparatus and methods for suitably energizing the motor 24 are disclosed in U.S. Pat. No. 4,509,611 to Kade et al. issued Apr. 9, 1985, and assigned to the assignee of the present invention.

The control unit 30 also controls the energization of an electric motor 36 as indicated by the line 38 to control the steering of rear wheels 40, 42. The motor 36 rotatably drives a pinion gear 44 which is maintained in meshing engagement with teeth formed on a rear rack 46. The rack 46, in turn, is mechanically connected to the rear wheel tie rods (not shown) so that the rear wheels 40, 42 steer together. In mechanizing such control, electrical signals indicative of the lateral and yaw velocities $V_y$, r and the front steering angle $D_f$ are supplied as inputs to the control unit 30 via lines 48–52. The lateral and yaw velocity inputs are obtained with conventional accelerometers (not shown), and the front steering angle $D_f$ is obtained with a rotary potentiometer 54 responsive to the rotary position of handwheel 16.

Figure 2:
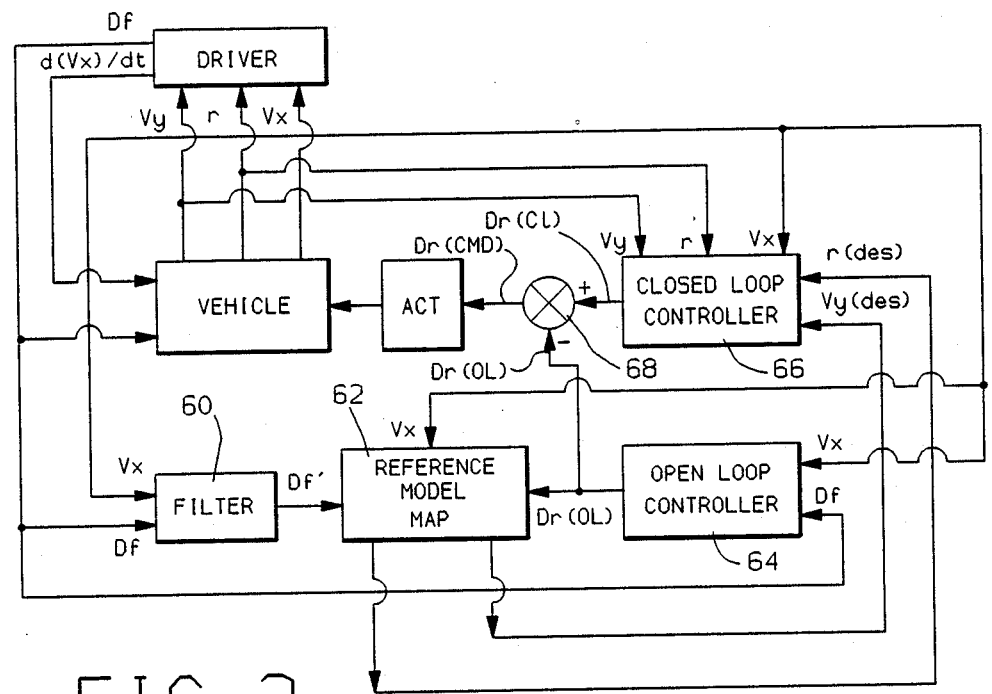
FIG. 2 is a system block diagram depicting the control of this invention.

The system diagram of FIG. 2 illustrates the control of this invention in a closed-loop reference model steering system having an open-loop feedforward feature, such combination being the subject of co-pending patent application U.S. Ser. No. 211,737, filed June 27, 1988, assigned to the assignee of the present invention.

Neglecting compliance in the steering column 18, the operator (DRIVER) of the vehicle 10 directly controls the steering angle $D_f$ of the front wheels 12, 14. As indicated in FIG. 1, the rear steering angle $D_r$ is controlled via motor 36, designed in FIG. 2 as ACTUATOR. In addition, the DRIVER manipulates an accelerator pedal or like control (not shown) to effectively command a desired longitudinal acceleration $d(V_x)/dt$ for the vehicle 10. The vehicle, in turn, is propelled at a longitudinal velocity $V_x$, and experiences given yaw and lateral velocities r, $V_y$ which are provided as feedback to the DRIVER.

The control unit 30 performs the functions of the FILTER 60, the REFERENCE MODEL MAP 62, the OPEN-LOOP CONTROLLER 64, the CLOSED-LOOP CONTROLLER 66, and the summing junction 68. The OPEN-LOOP CONTROLLER 64, described below in reference to FIG. 3, develops an open-loop feedforward command $D_r(OL)$ for the rear steer ACTUATOR as a function of the front steering angle $D_f$ and the longitudinal velocity $V_x$. The FILTER 60, described below in reference to FIGS. 4 and 5, generates a filtered front steering angle output $D_f'$ as a function of the front steering angle $D_f$ and the longitudinal vehicle velocity $V_x$. The filtered front steering angle $D_f'$, in turn, is applied as an input to the REFERENCE MODEL MAP 62 along with the longitudinal velocity indication $V_x$. The REFERENCE MODEL MAP 62 defines a desired vehicle response in terms of the desired yaw velocity r(des) and the desired lateral or slip velocity $V_y$(des). The CLOSED-LOOP CONTROLLER 64, described below in reference to FIGS. 6 and 7, develops a closed-loop steering command $D_r(CL)$ for the ACTUATOR for bringing the actual yaw and lateral velocities r, $V_y$ into correspondence with the desired yaw and lateral velocities r(des), $V_y$(des). The closed-loop control is also a function of the longitudinal velocity $V_x$ as indicated. Finally, the summing junction 68 develops a steering command $D_r(CMD)$ for the ACTUATOR according to the difference of the closed-loop command $D_r(CL)$ and the open-loop feedforward command $D_r(OL)$.

Figure 3:
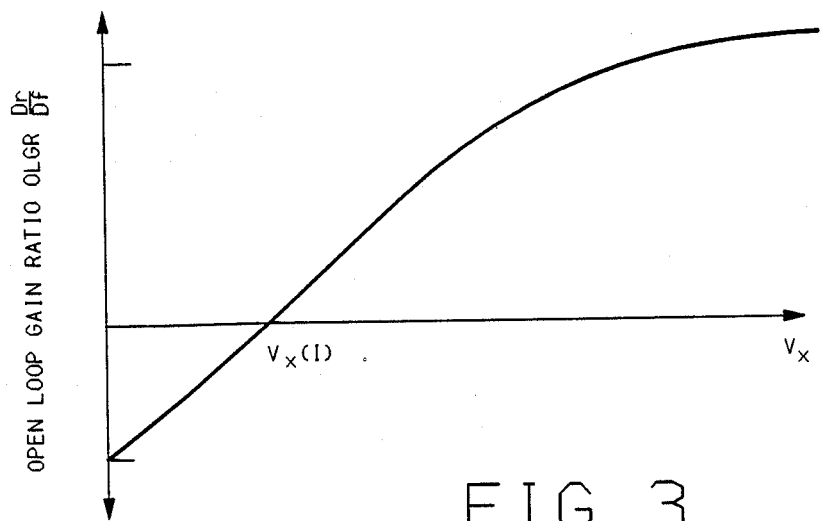
FIG. 3 graphically depicts the open-loop control function of FIG. 2.

FIG. 3 graphically depicts the gain ratio OLGR for OPEN-LOOP CONTROLLER 64 of FIG. 2. The gain ratio OLGR defines the magnitude and direction of the open-loop feedforward command $D_r(OL)$ per unit change in front steering angle $D_f$ as a function of the longitudinal velocity $V_x$. When $V_x$ is relatively low—less than $V_x(1)$ in FIG. 3—the ratio OLGR is negative for producing rear steering out-of-phase with the front steering. The ratio OLGR decreases as $V_x$ approaches $V_x(1)$, where the rear wheels 40, 42 are commanded to the straight position. When $V_x$ is greater than $V_x(1)$, the ratio OLGR is positive for producing rear steering in-phase with the front steering.

Figure 4:
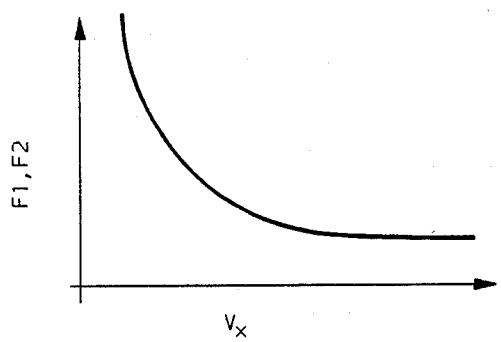
FIGS. 4 and 5 graphically depict the filter function of FIG. 2.
Figure 5:
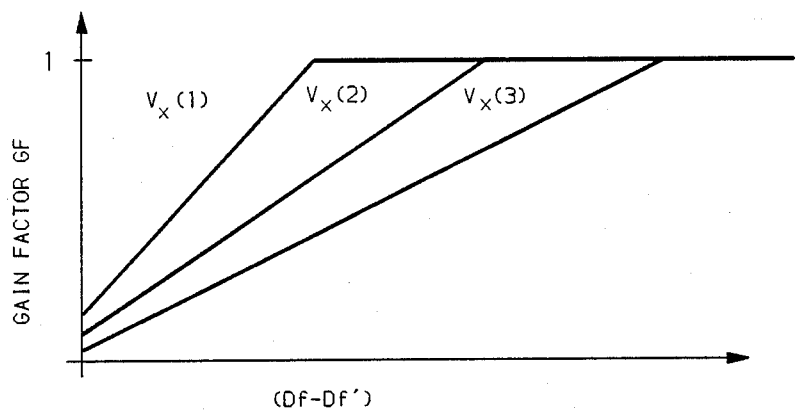
Figure 6:
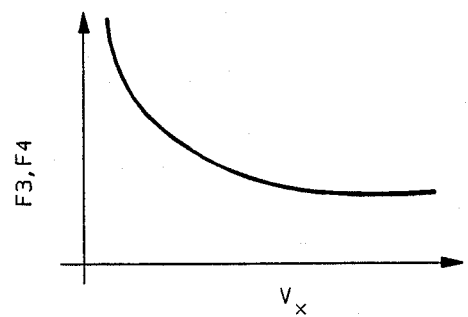
FIGS. 6 and 7 graphically depict the closed-loop control function of FIG. 2.

The FILTER 60 is disclosed herein as a nonlinear first-order lag filter, digitally implemented using the expression:

$$D_f'(\text{new}) = D_f'(\text{old}) + (D_f - D_f'(\text{old})) * GF$$

where $D_f'$(new) is the updated output value of FILTER 60, $D_f'$(old) is the past output value of FILTER 60, and GF is a filter (integrator) gain factor. The gain factor GF, in turn, is given by the expression:

$$GF = \text{lesser of 1 and } [F1 + |F2 * (D_f - D_f'(\text{old}))|]$$

where F1 and F2 are coefficients which vary as a function of the longitudinal velocity $V_x$. When the coefficients F1 and F2 are scheduled substantially as depicted in FIG. 4, the gain factor GF varies substantially as depicted in FIG. 5, where $V_x(1)$, $V_x(2)$ and $V_x(3)$ represent successively increasing values of longitudinal velocity $V_x$, and the expression $|(D_f - D_f'(\text{old}))|$ represents the change in the driver steering input. For any velocity $V_x$, it will be recognized that the corresponding gain factor slope is given by the coefficient F2, and the minimum gain factor value is given by the coefficient F1.

The output $D_f'$ of the above-described filter thus tracks the front steering angle $D_f$ at a delay or lag which varies as a function of the longitudinal velocity $V_x$ and the change in the driver generated steering input. The delay varies in inverse relation to the gain factor GF, and thus increases with increasing longitudinal velocity $V_x$ and decreases with increasing change in driver steering input.

Since the filtered signal $D_f'$ controls the closed-loop response to driver generated steering inputs, such response will be (1) relatively fast at low vehicle speed, becoming progressively slower as the vehicle speed increases, and (2) relatively slow for small changes in driver steering input, becoming progressively faster as the change in driver steering input increases. Item (1) ensures a stable control system response to driver generated steering inputs at progressively higher vehicle speeds, and item (2) reduces the control system sensitivity to low amplitude noise in the front steering angle signal $D_f$. Meanwhile, the control system response to externally generated steering inputs—wind gusts, for example—remains relatively fast and is unaffected by the operation of FILTER 60.

The REFERENCE MODEL MAP 62 is based on a cornering model of the vehicle 10 and generates a static or steady-state reference point ($V_y$(des), r(des)) for the CLOSED-LOOP CONTROLLER 66 to follow. The static model is mathematically represented by the matrix expression:

$$\begin{bmatrix} V_y(des) \\ r(des) \end{bmatrix} = \begin{bmatrix} A_{11} & A_{12} \\ A_{21} & A_{22} \end{bmatrix}^{-1} \begin{bmatrix} B_{11} & B_{12} \\ B_{21} & B_{22} \end{bmatrix} \begin{bmatrix} D_f \\ D_r(OL) \end{bmatrix}$$

The A and B matrix terms are defined in terms of the front and rear cornering stiffnesses $C_f$, $C_r$, the front steering angle $D_f$, the open-loop feedforward rear steering angle $D_r(OL)$, the yaw moment of inertia $I_z$, the longitudinal velocity $V_x$, the vehicle mass m, the distance $L_1$ between the front wheel axis and the vehicle center of gravity, and the distance $L_2$ between the rear wheel axis and the center of gravity as follows:

$$A_{11} = \frac{-(C_r + C_f)}{mV_x} \quad A_{12} = \frac{C_r l_2 - C_f l_1}{mV_x}$$

$$A_{21} = \frac{l_2 C_r - l_1 C_f}{I_z V_x} \quad A_{22} = \frac{-C_f l_1{}^2 - C_r l_2{}^2}{I_z V_x}$$

$$B_{11} = \frac{C_f}{m} \quad B_{12} = \frac{C_r}{m}$$

$$B_{21} = \frac{l_1 C_f}{I_z} \quad B_{22} = \frac{-l_2 C_r}{I_z}$$

In order to conveniently implement the above described reference model with a real-time controller, such as the control unit 30, the A and B matrix terms may be combined into four term a, b, c, d, and computed off-line as a function of the longitudinal velocity $V_x$. Thereafter, the computed values a, b, c, d, or a simplified mathematical representation of the same, may be stored in the control unit 30 to effect relatively fast real-time computation of the yaw and lateral velocity terms r(des) and $V_y$(des).

In a mechanization of the present invention, the computed values a, b, c, d were characterized by the second-order polynomial expressions:

$a = a_1 V_x + a_2 V_x{}^2$ $b = b_1 V_x + b_2 V_x{}^2$ $c = c_1 V_x + c_2 V_x{}^2$ $d = d_1 V_x + d_2 V_x{}^2$ where $a_1$, $a_2$, $b_1$, $b_2$, $c_1$, $c_2$, $d_1$ and $d_2$ are constants. This yields the algebraic expressions:

$V_y(\text{des}) = a * D_f' + b * D_r(\text{OL})$, and $r(\text{des}) = c * D_f' + d * D_r(\text{OL})$ It will be noted in that in the above described embodiment, the open-loop feedforward term $D_r$(OL) is used as an input to the reference model. In such case, the open-loop term $D_r$(OL) is not affected by the FILTER 60 and the control system response thereto is substantially immediate. However, if a slower open-loop response is desired, the open-loop feedforward term $D_r$(OL) can be replaced with the product ($D_f'$ * OLGR).

The CLOSED-LOOP CONTROLLER 66 compares the reference yaw and lateral velocity terms $V_y$(des) and r(des) with the measured yaw and lateral velocity $V_y$ and r to develop a closed-loop error term E(CL) according to the expression:

$E(CL) = (r(\text{des}) - r) * F3 + (V_y(\text{des}) - V_y) * F4$

Figure 7:
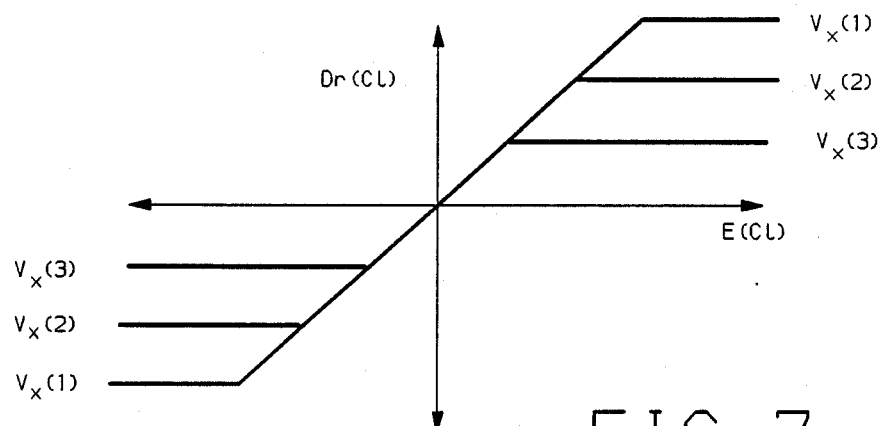

The coefficients F3 and F4 are scheduled as a function of the longitudinal velocity $V_x$ substantially as depicted in FIG. 7, resulting in a similar speed-dependent variation in the error term E(CL). This ensures that the closed-loop response rate decreases with increasing vehicle speed.

The closed-loop steering command $D_r$(CL), in turn, is determined by applying the closed-loop error term E(CL) to a saturation function as graphically depicted in FIG. 7. The saturation (limiting) point is scheduled as a function of the longitudinal velocity $V_x$ as indicated by the successively increasing velocity values $V_x(1)$, $V_x(2)$ and $V_x(3)$. This has the effect of reducing the closed-loop steering command $D_r$(CL) per unit closed-loop error with increasing vehicle speed, again contributing to high speed stability of the vehicle.

The closed-loop steering command $D_r$(CL) and the open-loop feedforward command $D_r$(OL) are differenced as indicated by the summing junction 68 to form a rear steering command $D_r$(CMD). The command $D_r$(CMD) is applied to the ACTUATOR which, in turn, positions the rear wheels 40, 42 accordingly.

Figure 8A:
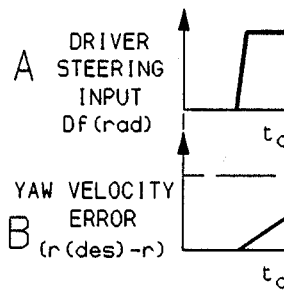
FIGS. 8a–8b and 9 graphically depict the response of the control of this invention to various driver and externally generated steering inputs.
Figure 8B:
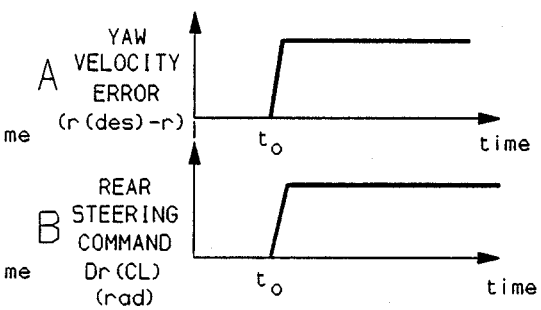

The different response rates of the above-described control to driver and externally generated steering inputs graphically depicted in FIGS. 8a and 8b. Each Figure includes two graphs A and B on a common time base.

In FIG. 8a, the driver of the vehicle initiates a steering maneuver at time $t_0$ as seen in Graph A. Although this produces a change in the yaw velocity r of the vehicle, the closed-loop yaw velocity error term (r(des) − r) is delayed due to the operation of the FILTER 60 on the front steering angle $D_f$—that is, the reference yaw velocity r(des) is determined according to the filtered front steering angle $D_f'$. Since the closed-loop yaw velocity correction lags the yaw velocity error term, the closed-loop rear steering response to the driver steering input is relatively slow.

In FIG. 8b, an externally generated steering input—due to a wind gust, for example—occurs beginning at time $t_0$. This results in an immediate closed-loop yaw velocity error (r(des) − r), as seen in Graph A. The yaw velocity error, in turn, produces a substantially immediate closed-loop rear steering correction $D_r$(CL), as seen in Graph B, yielding a relatively fast control response to externally generated steering inputs.

Figure 9:
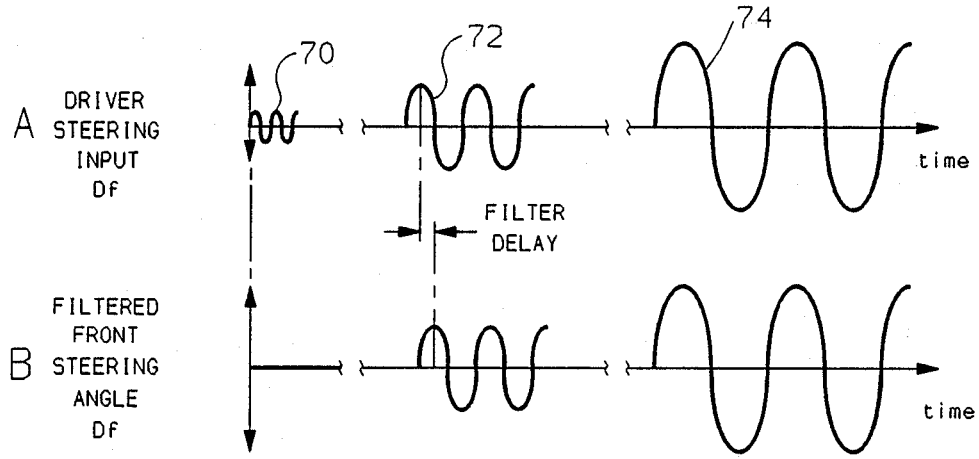

FIG. 9 graphically depicts the amplitude sensitivity of the FILTER 60 for various operating conditions. Variations in the front steering angle signal $D_f$ are shown in Graph A, and the filtered signal $D_f'$ is shown in Graph B on the same time base. Graph A depicts three types of front steering angle signal variations—noise, low amplitude driver steering input and high amplitude driver steering input—separated by discontinuities in the time scale.

The random noise signal variation is designated in Graph A by the reference numeral 70. Such signal variation may be the product of radiated energy, sensor error, etc. and does not represent an intentional driver steering input. Due to the steering amplitude sensitivity of FILTER 60, described above in reference to FIG. 5, the filter gain factor GF is relatively low. Consequently, the output $D_f'$ of FILTER 60 is substantially insensitive to the noise variations and experiences little or no variation, as seen in the corresponding time scale of Graph B. Since the driver-responsive closed-loop control is a function of the filtered signal $D_f'$, little or no rear steering results.

The low amplitude driver steering input is represented in Graph A by the generally sinusoidal waveform 72. Such variations correspond to an intermediate gain factor (GF) value for FILTER 60 as may be seen in reference to FIG. 5, resulting in a filtered signal $D_f'$ which tracks the steering signal with a phase lag as indicated in Graph B. Such lag or delay, results in a relatively slow response rate for the closed-loop control.

The filter gain factor GF increases with continued increases in the driver steering signal amplitude variations, resulting in a progressive decrease in the amount of filter lag or delay. A limit condition is depicted by the high amplitude sinusoidal driver steering input 74 in Graph A in that the gain factor GF has reached its limiting value of unity. In such case, the filtered steering signal $D_f'$ is equal to the unfiltered steering signal $D_f$, resulting in a relatively fast response rate for the closed-loop control.

Figure 10:
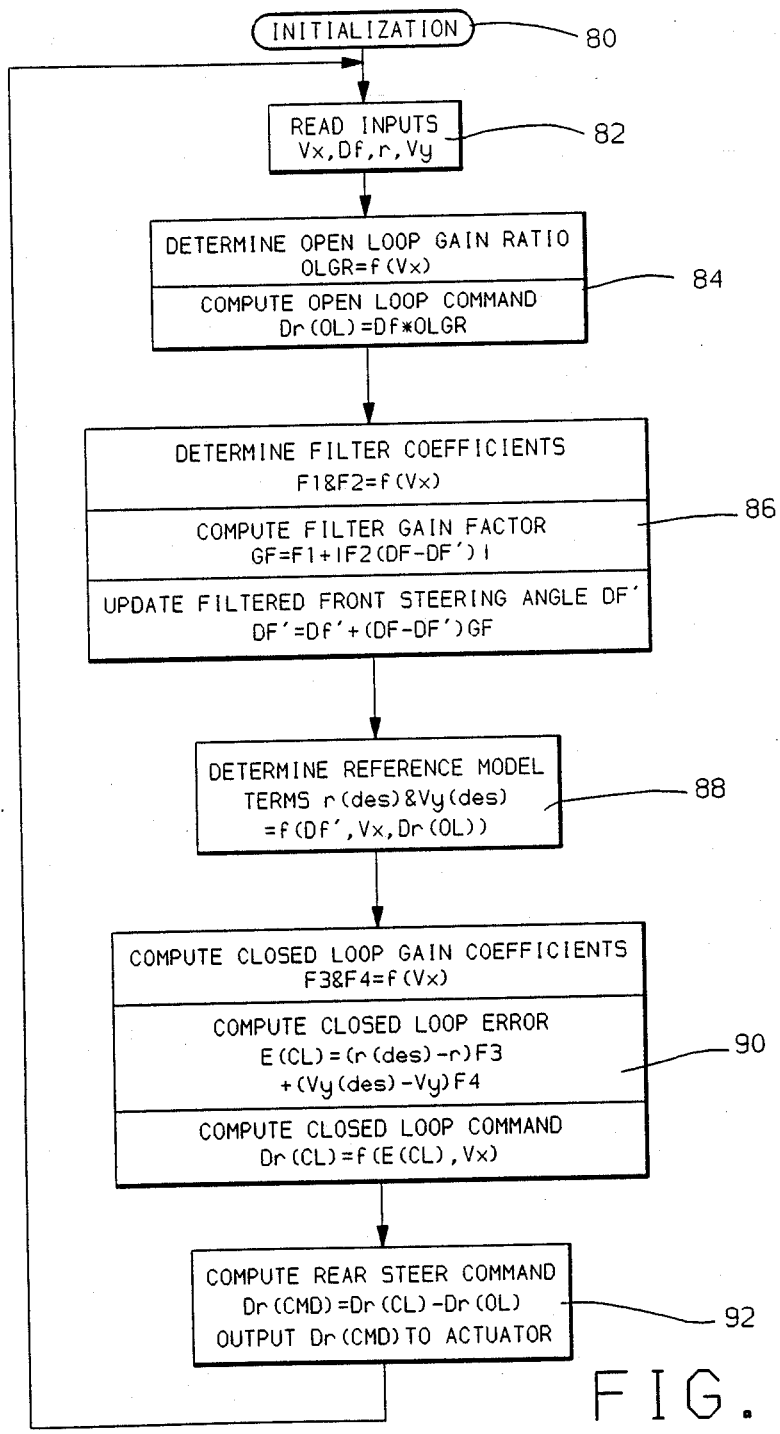
FIG. 10 is a flow diagram representative of computer program instructions executed by the computer-based control unit of FIG. 1 in carrying out the control of this invention.

The flow diagram of FIG. 10 represents computer program instructions executed by the computer based control unit 30 in carrying out the control of this invention. The INITIALIZATION block 80 represents a series of instructions executed at the initiation of each period of vehicle operation for initializing the various registers, input counters and flags used in connection with the control of this invention. Thereafter, the instruction blocks 82–92 are repeatedly and sequentially executed as indicated by the flow lines and the return line 94.

The instruction block 82 serves to read and condition the various input signals including the longitudinal velocity $V_x$, the front wheel steering angle $D_f$, the actual yaw velocity r, and the actual lateral or slip velocity $V_y$. As indicated in FIG. 1, such signals are supplied to the control unit 30 via lines 34, 52, 50 and 48.

The instruction block 84 pertains to the open-loop feedforward function designated by the OPEN-LOOP CONTROLLER 66 in FIG. 2. The performance of such function comprises the steps of determining the open-loop gain ratio OLGR as a function of the longitudinal velocity $V_x$, and computing the open-loop feedforward command $D_r(CMD)$ as a product of the measured front steering angle $D_f$ and the term OLGR.

The instruction block 86 pertains to the front steering angle filter function designated by the FILTER 60 in FIG. 2. This involves the determination of coefficients F1 and F2, the computation of the gain factor GF, and the updating of the filter output $D_f'$ according to the product of the steering angle change and the computed gain factor GF. On initialization of the control, the instructions designated by the block 80 initially set the filtered front steering value $D_f'$ to zero.

The instruction block 88 pertains to the reference model function designated by the REFERENCE MODEL MAP 62 in FIG. 2. The reference model inputs include the filtered front steering angle $D_f'$, the vehicle longitudinal velocity $V_x$, and the open-loop feedforward steering command $D_r(OL)$. Based on such inputs, the reference model maps the reference (desired) yaw and lateral velocity values r(des), $V_y$(des).

The instruction block 90 pertains to the closed-loop control function designated by the CLOSED-LOOP CONTROLLER block 66 of FIG. 2. As indicated at block 90, this involves the determination of the coefficients F3 and F4, and the computation of the closed-loop error term E(CL) and steering command $D_r(CL)$.

The instruction block 92 performs the function of summing junction 68 of FIG. 2. It computes a rear steer command $D_r(CMD)$ according to the difference between the closed-loop steering command $D_r(CL)$ and the open-loop feedforward steering command $D_r(OL)$, and outputs the command $D_r(CMD)$ to motor 36 as represented by the ACTUATOR in FIG. 2.

While this invention has been illustrated in reference to the illustrated embodiment, it will be understood that the scope of the present invention is not limited thereto. The use of the open-loop feedforward term $D_r(OL)$, for example, is unnecessary to a mechanization of the present invention. Moreover, various modifications to the illustrated embodiment may occur to those skilled in the art, and it should be understood that systems incorporating such modifications may also fall within the scope of this invention, which is defined by the appended claims.

The embodiments of the invention in which an exclusive property or privilege is claimed are defined as follows:

1. A rear wheel steering system for a four-wheeled motor vehicle in which the front wheels of the vehicle are steered at an angle directly related to steering inputs generated by the vehicle operator, comprising:
   reference model means for generating yaw and lateral velocity commands in accordance with a representation of the steering angle of the front wheels for achieving a desired vehicle response;
   means for determining the actual yaw and lateral velocities of the vehicle;
   closed-loop control means for steering the rear wheels at an angle determined in relation to the deviation of the actual yaw and lateral velocities of the vehicle from the commanded yaw and lateral velocities, thereby establishing a first relatively fast steering response rate to externally generated forces which disturb the yaw or lateral velocities of the vehicle;
   sensor means for developing a front steering angle signal corresponding to the sensed steering angle of the front wheels; and
   filter means for filtering the front steering angle signal to form a representation of the front wheel steering angle for said reference model means, the steering angle indicated by such representation being delayed in time with respect to the sensed steering angle, thereby to establish a second relatively slow steering response rate to operator generated steering inputs.

2. A rear wheel steering system for a four-wheeled motor vehicle in which the front wheels of the vehicle are steered at an angle directly related to steering inputs generated by the vehicle operator, comprising:
   means for determining the actual yaw and lateral velocities of the vehicle;
   sensor means for developing a front steering angle signal corresponding to the sensed steering angle of the front wheels;
   rear steering control means including reference model means for generating yaw and lateral velocity commands in accordance with a representation of the steering angle of the front wheels for achieving a desired vehicle response, closed-loop control means for steering the rear wheels at an angle determined in relation to the deviation of the actual yaw and lateral velocities of the vehicle from the commanded yaw and lateral velocities, and filter means for filtering the front steering angle signal to form a representation of the front wheel steering angle for said reference model means which lags the sensed steering angle in time, whereby the rear wheel steering response is carried out (1) at a relatively fast rate defined by the closed-loop control means when externally generated forces disturb the yaw or lateral velocities of the vehicle, and (2) at a relatively slower rate defined by the combination of the closed-loop control means and the lag of the filter means when the operator generates a steering input.

3. The rear wheel steering system set forth in claim 2, wherein the filter means is a first-order lag filter, represented substantially by the expression:

$$D_f'(\text{new}) = D_f'(\text{old}) + (D_f - D_f'(\text{old})) * GF$$

where $D_f$ is the sensed front wheel steering angle, $D_f'(\text{new})$ is the current output value of the filter means, $D_f'(\text{old})$ is a past output value of the filter means, and GF is a gain factor of the filter means.

4. The rear wheel steering system set forth in claim 3, wherein the gain factor GF is scheduled in relation to the longitudinal velocity of the vehicle such that the delay introduced by the filter means causes the rear wheel steering response to operator generated steering inputs to decrease with increasing longitudinal velocity of the vehicle, thereby contributing to improved stability at such increased vehicle velocities.

5. The rear wheel steering system set forth in claim 3, wherein the gain factor GF is scheduled in relation to a measure of the rate of change in operator steering input such that the delay introduced by the filter means causes the rear wheel steering response to operator generated steering inputs to increase with increasing rate of change in the operator steering input, thereby reducing the sensitivity of the rear wheel steering response to relatively low amplitude noise in the signal representing the front steering angle $D_f$.

6. The system set forth in claim 5, wherein the measure of the rate of change in operator steering input is determined substantially according to the expression:

$$D_f - D_f'(\text{old}).$$

7. The system set forth in claim 3, wherein the gain factor GF is determined according to the lesser of 1 and the expression:

$$F1 + |F2 * (D_f - D_f'(\text{old}))|$$

where F1 and F2 are gain coefficients.

8. The system set forth in claim 7, wherein the gain coefficients are scheduled in relation to the longitudinal velocity of the vehicle such that the gain factor GF tends to decrease with increasing longitudinal velocity of the vehicle, thereby to reduce the rear wheel steering response to operator generated steering inputs at such increased longitudinal velocities.

* * * * *